(12) United States Patent
Jariabka et al.

(10) Patent No.: US 11,584,128 B2
(45) Date of Patent: Feb. 21, 2023

(54) PRINTHEAD PRIMING AND VENTING

(71) Applicant: Hewlett-Packard Development Company, L.P., Spring, TX (US)

(72) Inventors: Keith Jariabka, Vancouver, WA (US); Berne Strom, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 206 days.

(21) Appl. No.: 16/958,196

(22) PCT Filed: Jan. 19, 2018

(86) PCT No.: PCT/US2018/014561
§ 371 (c)(1),
(2) Date: Jun. 26, 2020

(87) PCT Pub. No.: WO2019/143361
PCT Pub. Date: Jul. 25, 2019

(65) Prior Publication Data
US 2021/0070050 A1    Mar. 11, 2021

(51) Int. Cl.
| | | |
|---|---|---|
| *B41J 2/165* | (2006.01) |
| *B41J 29/38* | (2006.01) |
| *B41J 2/19* | (2006.01) |
| *B33Y 30/00* | (2015.01) |
| *B29C 64/35* | (2017.01) |
| *B41J 29/02* | (2006.01) |

(52) U.S. Cl.
CPC ........... *B41J 2/16511* (2013.01); *B29C 64/35* (2017.08); *B33Y 30/00* (2014.12); *B41J 29/02* (2013.01); *B41J 29/38* (2013.01); *B41J 2/19* (2013.01); *B41J 2002/16594* (2013.01)

(58) Field of Classification Search
CPC ......... B41J 2/16511; B41J 2002/16594; B41J 2/19; B41J 29/02; B41J 29/38; B29C 64/35; B33Y 30/00; B33Y 40/00
See application file for complete search history.

(56) References Cited

U.S. PATENT DOCUMENTS

| | | |
|---|---|---|
| 4,543,591 A | 9/1985 | Terasawa |
| 5,257,044 A | 10/1993 | Carlotta et al. |
| 6,231,174 B1 | 5/2001 | Haigo |
| 6,491,368 B1 | 12/2002 | Cipolla et al. |
| 6,523,931 B1 | 2/2003 | Cipolla et al. |
| 7,988,255 B2 | 8/2011 | Balcan et al. |
| 8,857,949 B2 | 10/2014 | Seino et al. |
| 9,539,815 B2 | 1/2017 | Martin et al. |

(Continued)

FOREIGN PATENT DOCUMENTS

| | | |
|---|---|---|
| EP | 0622200 B1 | 11/1994 |
| EP | 0736387 B1 | 10/1996 |

*Primary Examiner* — Yaovi M Ameh
(74) *Attorney, Agent, or Firm* — Brooks, Cameron & Huebsch, PLLC

(57) ABSTRACT

An example apparatus includes a cap to seal a printhead in a printhead assembly, where the cap includes a priming port and a venting port. A vent connected to the venting port is sealed by a cam controlled vent-arm while a vacuum pump connected to the priming port applies a vacuum to prime the printhead. The vent is unsealed by the cam controlled vent-arm and the vacuum pump clears ink from the priming cap.

19 Claims, 16 Drawing Sheets

(56) References Cited

U.S. PATENT DOCUMENTS

| | | | |
|---|---|---|---|
| 2010/0118082 A1* | 5/2010 | Tojo | B41J 2/16532 |
| | | | 347/30 |
| 2010/0253738 A1 | 10/2010 | Jariabka | |
| 2011/0242205 A1* | 10/2011 | Ogawa | B41J 2/16511 |
| | | | 347/29 |
| 2014/0368575 A1* | 12/2014 | Kamiyama | B41J 2/16552 |
| | | | 347/28 |

* cited by examiner (Detail A)

(Section A-A of Figure 21)

(Section B-B of Figure 21)

(Section C-C of Figure 21)

(Section A-A of Figure 21)

(Section B-B of Figure 21)

(Section C-C of Figure 21)

(Section A-A of Figure 21)

(Section B-B of Figure 21)

(Section C-C of Figure 21)

(Section A-A of Figure 21)

(Section B-B of Figure 21)

(Section C-C of Figure 21)

(Section A-A of Figure 21)

(Section B-B of Figure 21)

(Section C-C of Figure 21)

PRINTHEAD PRIMING AND VENTING

BACKGROUND

Printheads are used in a variety of printers to dispense or deposit a material for printing. For example, in inkjet printers, printheads may deposit a fluid (e.g., an ink) onto a print medium (e.g., paper). Similarly, in three-dimensional (3D) printers, printheads may be used to deposit a layer of material (e.g., powder) to be fused or cured to form the desired 3D object.

BRIEF DESCRIPTION OF THE DRAWINGS

For a more complete understanding of various examples, reference is now made to the following description taken in connection with the accompanying drawings in which.

DETAILED DESCRIPTION

As noted above, printheads are used to dispense or deposit a material (e.g., ink) for printing in a variety of printers, including inkjet printers and 3D printers. In this regard, during normal operation, air may accumulate or enter the printhead as the material is directed from a supply, such as an ink cartridge, through the printhead. Such air in the printhead may damage the printhead or degrade its performance.

Priming printheads in a variety of printers can remove air bubbles that can impair printing performance and reliability. In some implementations, priming may be accomplished by capping the printhead and extracting both a printing fluid (e.g., ink) and air from the printhead under vacuum through a vacuum line connected to the cap. The priming operation may leave ink in the priming cap and ink froth in the vacuum line that can interfere with subsequent priming.

Various examples described herein provide for separate priming and venting ports on the priming cap (e.g., such as to clear print fluids from the priming cap and vacuum line after priming), connected respectively to a vacuum pump and a vent. The venting may be controlled using a camshaft driven vent-arm that determines the timing of the priming and venting operations. During priming, the vent is closed, which allows the vacuum pump to form a vacuum condition. After priming, the vent is opened while the vacuum pump continues to operate and clears the priming cap and vacuum line, such as without drawing additional ink from the printhead.

Figure 1:
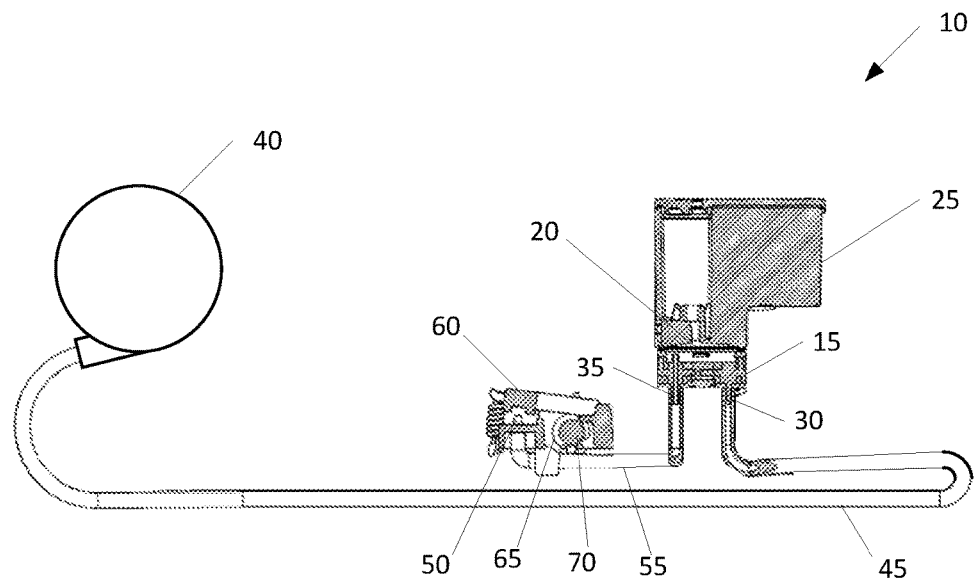
FIG. 1 is a partial sectional view of an example priming and venting assembly.

Referring now to the figures, FIG. 1 is a partial sectional view of an example priming and venting assembly 10. Example priming and venting assembly 10 includes a priming cap 15 to seal a set of nozzles 20 in a printhead assembly 25. As used herein, a "nozzle" refers to an opening through which a material, such as a fluid, is ejected, such as onto a print medium. Further, a "cap" refers to a portion to securely close, cover or seal a component or an opening such as a port or a nozzle, for example. A "printhead assembly" refers to an arrangement with at least one printhead that may be coupled to a reservoir or supply of printing material (e.g., ink). In various examples, a printhead includes nozzles arranged to eject the printing material.

The priming cap 15 includes a priming port 30 and a venting port 35. The priming port 30 is provided to allow the printing material to be drawn or removed from the printhead assembly, and the venting port 35 is provided to allow air to be drawn or removed from the printhead assembly. Thus, as used herein, a "priming port" and "venting port" refer to solid or fluid-traversable openings in the priming cap.

A vacuum pump 40 is in fluid communication with the priming port 30 via a vacuum line 45, and a vent 50 is in fluid communication with the venting port 35 via a vent line 55. In this regard, the vacuum pump 40 may be provided to pull air from the priming port 30 to create a negative pressure, thus generating a force to extract material through the priming port 30.

Referring again to the example assembly 10 of FIG. 1, a vent-arm 60 engages with a cam 65 on a camshaft 70 to selectively seal (e.g., securely closing an opening, such as to not allow fluids to traverse a vent) and unseal (e.g., opening of a sealed opening, such as to allow fluids to traverse a vent) the vent 50. The vent-arm 60 may be an extension that is hinged on an axis. The camshaft 70 may be coupled to a motor to rotate the cam 65 about the camshaft 70. In one example, the cam 65 is a circular component mounted on the camshaft 70 at an off-center position. Rotation of the cam 65 about the camshaft 70 causes the vent-arm 60 to swing about the hinge, either up or down in FIG. 1. Other examples of printhead priming and venting are described in detail below.

Figure 2:
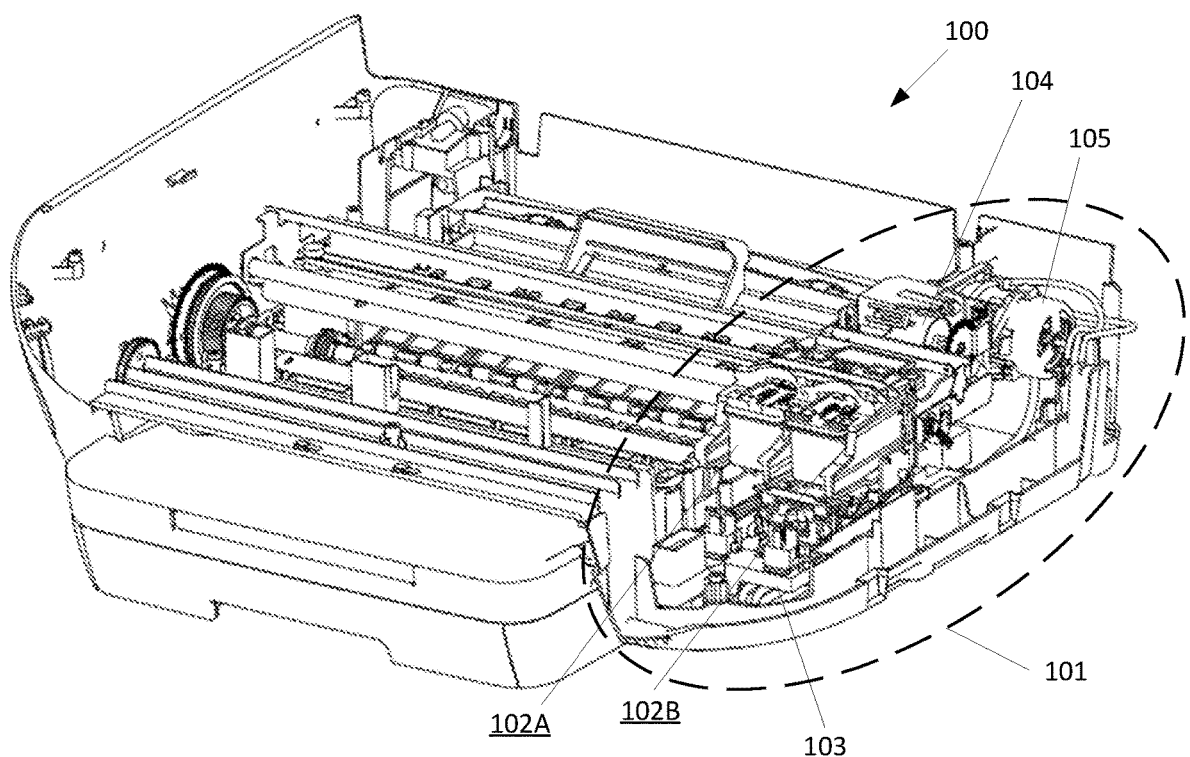
FIG. 2 is a cutaway view of an example printer assembly.
Figure 3:
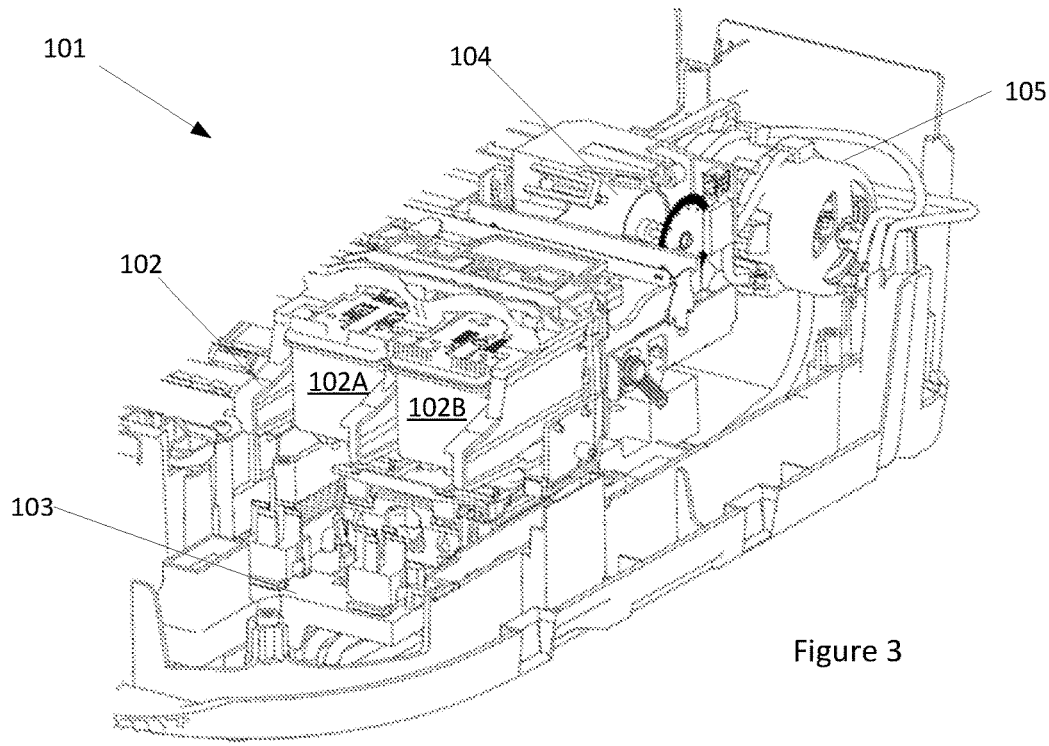
FIG. 3 is a perspective view of a subassembly of the example printer assembly.

FIG. 2 illustrates a cutaway view of an example printer assembly 100. Example printer assembly 100 includes a subassembly 101 that is illustrated in greater detail in FIG. 3. As shown in FIGS. 2 and 3, subassembly 101 includes an example print carriage assembly 102 including a first printhead assembly 102A and a second printhead assembly 102B, each printhead assembly including nozzle plate (not shown)

with a set of nozzles (including at least one nozzle) to dispense ink. The subassembly 101 also includes an example service station 103 engaged with the print carriage assembly 102, an example motor 104 to operate the subassembly 101, and an example vacuum pump 105 to supply a vacuum for priming the print carriage assembly 102. In the configurations illustrated in FIGS. 2 and 3, with the service station 103 engaged with the print carriage assembly 102, the printer assembly 100 is in a nonprinting mode, either with the print carriage assembly 102 being primed by the service station 103 or in storage after priming. For printing, the service station 103 can be disengaged from the print carriage assembly 102 and moved to the back of the printer assembly 100 as described in greater detail below.

Figure 4:
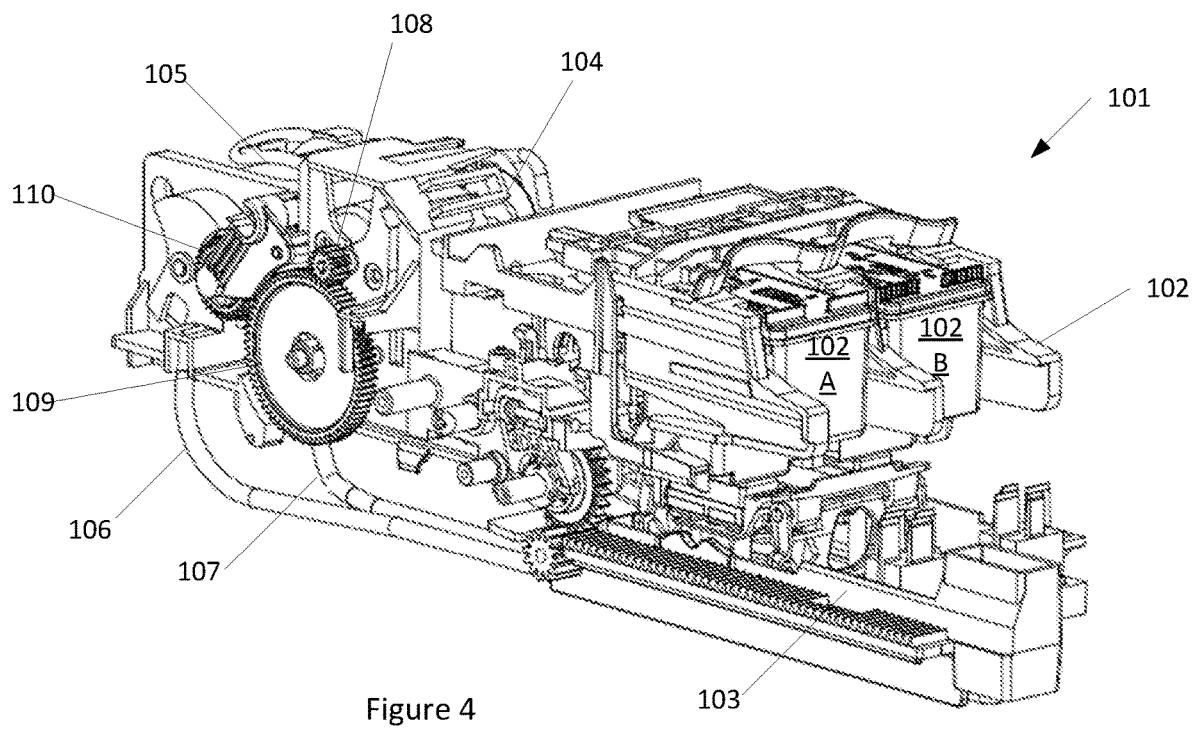
FIG. 4 is a perspective view of isolated portions of the subassembly of FIG. 3.

FIG. 4 is a perspective view of isolated portions of subassembly 101 including the print carriage assembly 102, the service station 103, the motor 104 and the vacuum pump 105. Also illustrated in FIG. 4 are vacuum lines 106 and 107 that connect the vacuum pump 105 to corresponding printheads in the print carriage assembly 102, as described below. In one example, the print carriage assembly 102 may include a black ink printhead and a color ink printhead that dispenses multiple ink colors, such as yellow, cyan and magenta for example. The example illustrated in FIG. 4 also includes a series of gears (collectively, the "transmission") to operate the vacuum pump 105 (and other operations not described herein). These gears include a drive gear 108 on the drive shaft of the motor 104, an idler gear 109 engaged with the drive gear 108, and a driven gear 110 engaged with the idler gear 109 that operates the vacuum pump 105.

Figure 5:
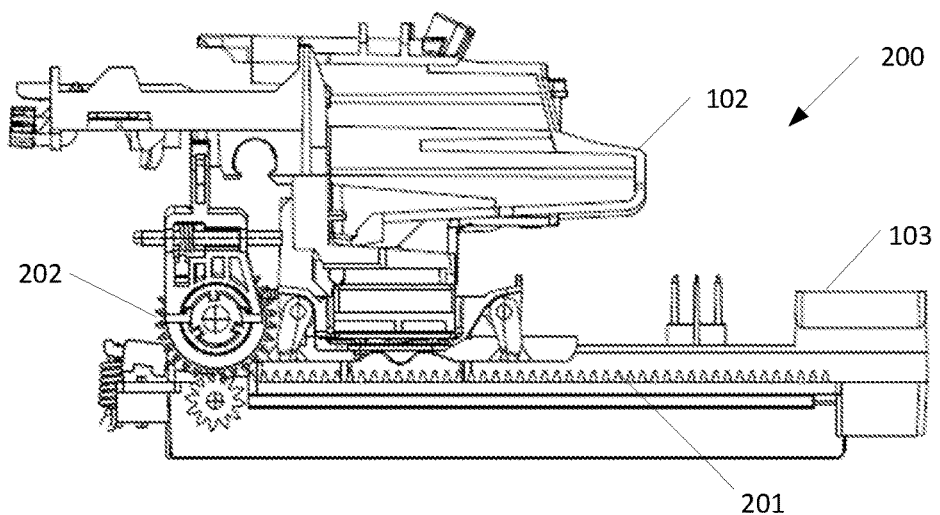
FIG. 5 is a side view of an example service station engaged with an example printhead assembly.
Figure 6:
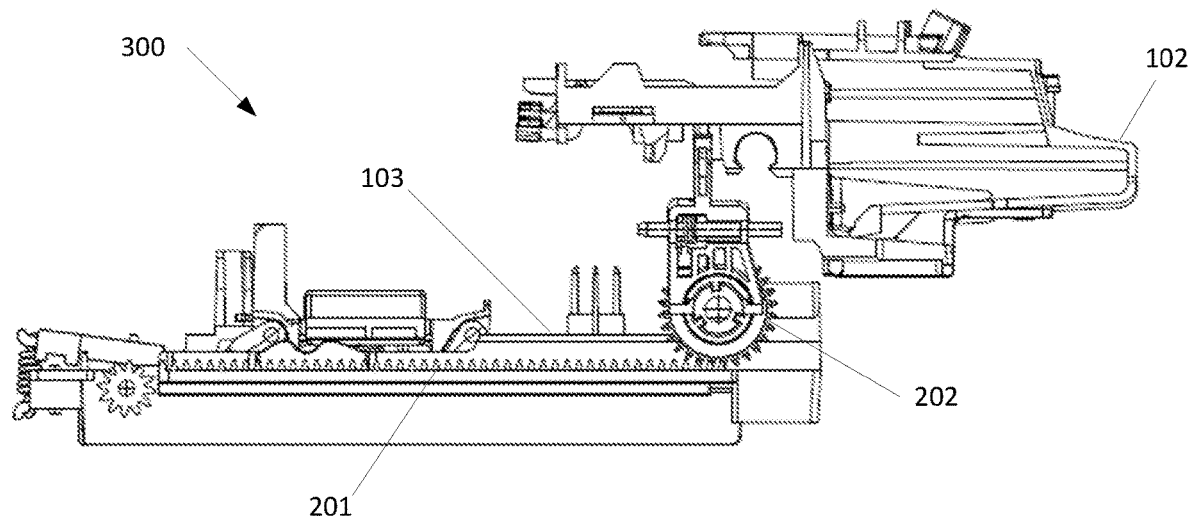
FIG. 6 is a side view of the example service station disengaged from the example printhead assembly.

FIG. 5 is a side view 200 of the subsystem 101 with the print carriage assembly 102 and the service station 103 when they are engaged for priming or storage as illustrated in FIG. 3 and described above. FIG. 6 is a side view 300 of example printer assembly 100 illustrating the relative positions of the print carriage assembly 102 and the service station 103 when the service station 103 is not engaged with the print carriage assembly 102, and the printer assembly 100 is in printing mode. In the position illustrated in FIG. 6, for reference, the print carriage assembly 102 moves into the plane of the illustration to traverse the print carriage of the printer assembly 100. In one example, as suggested by the position of the print carriage assembly 102 in FIGS. 5 and 6, the print carriage assembly 102 remains stationary during the disengagement process while the service station 103 moves out from under it.

In one example, the engagement and disengagement of the print carriage assembly 102 and the service station 103 is controlled by a rack 201 and pinion 202, as illustrated in FIGS. 5 and 6. In the views illustrated in FIGS. 5 and 6, the pinion 202 is rotated counterclockwise to engage the service station 103 with the print carriage assembly 102, and clockwise to disengage the service station 103 from the print carriage assembly 102. In various examples, the pinion 202 may be directly driven or indirectly driven. In one example, the position of the service station 103 may be detected by a linear position encoder (not shown) that controls a drive motor (not shown) in a feedback control loop. In one example, the motor that drives the pinion 202 may include a torque sensor (not shown) that stops the motor when a predetermined torque limit is reached at the end of travel of the service station 103.

Figure 7:
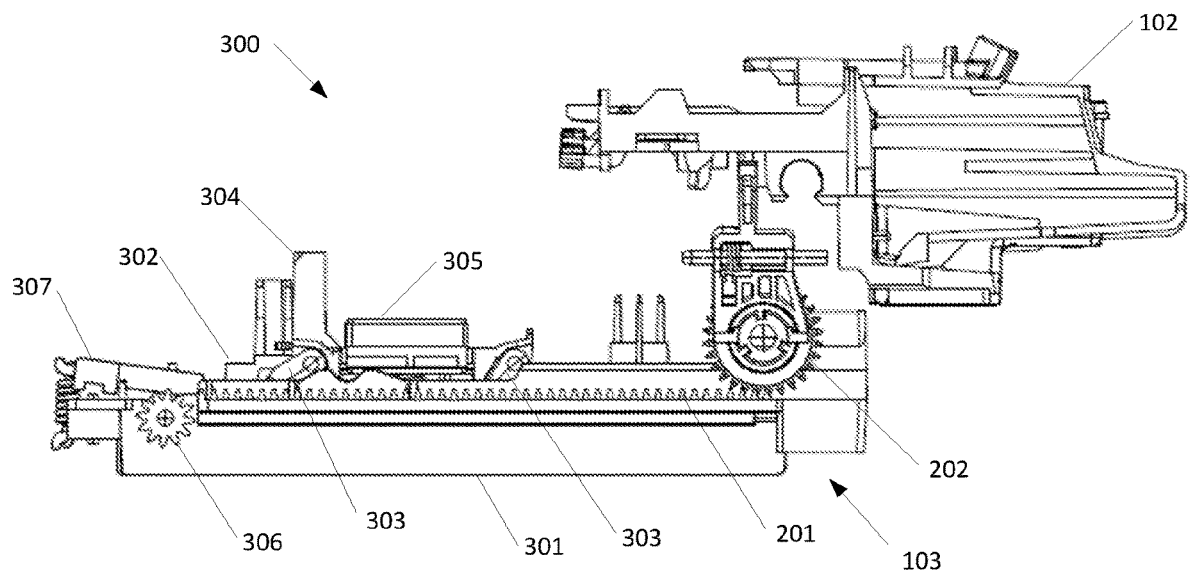
FIG. 7 is an enlarged view of FIG. 6.

FIG. 7 is an enlargement of FIG. 6 to illustrate additional details of the service station 103. In one example, as illustrated in FIG. 7, service station 103 includes a shuttle 301 and a cap sled assembly 302 attached to the shuttle by pivoting links 303. In one example, cap sled assembly 302 includes a post 304 to engage the print carriage assembly 102 when the shuttle is moved to the priming position, and priming caps 305 (one for each printhead) to prime the print carriage assembly 102 when the shuttle is moved to the priming position. As illustrated in FIG. 7, the pivoting links 303 are rotated clockwise, which lowers the cap sled assembly 302. The cap sled assembly 302 may be biased to this lowered position by a spring (not shown) or by gravity alone. It will be appreciated that this lowered position provides clearance between the cap sled assembly 302 and the print carriage assembly 102 when the service station 103 initially engages the print carriage assembly 102. Shuttle 301 also includes a geared camshaft 306 described in greater detail below.

Figure 8:
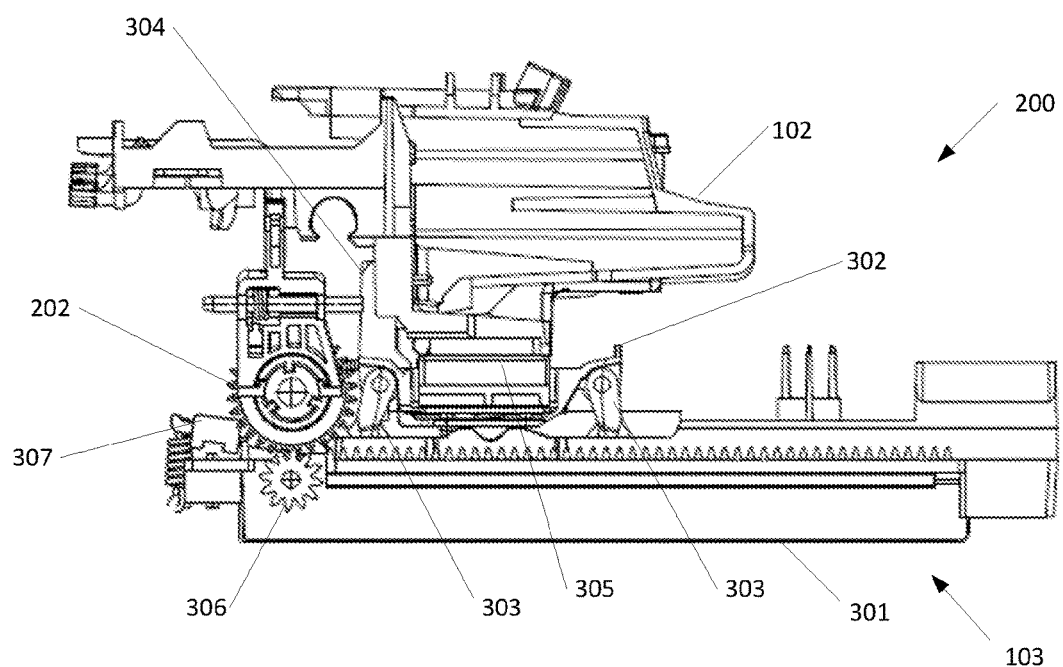
FIG. 8 is an enlarged view of FIG. 5.

FIG. 8 is an enlargement of FIG. 5 to illustrate additional details of the engagement of the service station 103 with the print carriage assembly 102. As previously described, the service station 103 is translated to engage with the print carriage assembly 102 by the action of the pinion 202 on the rack 201. In one example, as the service station 103 approaches the print carriage assembly 102, the first point of contact between the service station 103 and the print carriage assembly 102 will occur when the post 304 contacts the print carriage assembly 102 as the service station 103 is translated by the rack 201 and pinion 202. It will be appreciated that when this contact is made, the cap sled assembly 302 will be prevented from further translation while the shuttle 301 continues its movement under the motive power of the pinion 202, and that the relative motion between the shuttle 301 and the cap sled assembly 302 will result in a counterclockwise rotation of the pivoting links 303 that will raise the cap sled assembly 302 to engage the caps 305 with the print carriage assembly 102. In the configuration illustrated in FIG. 8, the pinion 202 has reached the end of the rack 201 and engaged the geared camshaft 306, which it subsequently rotates as described below.

Figure 9:
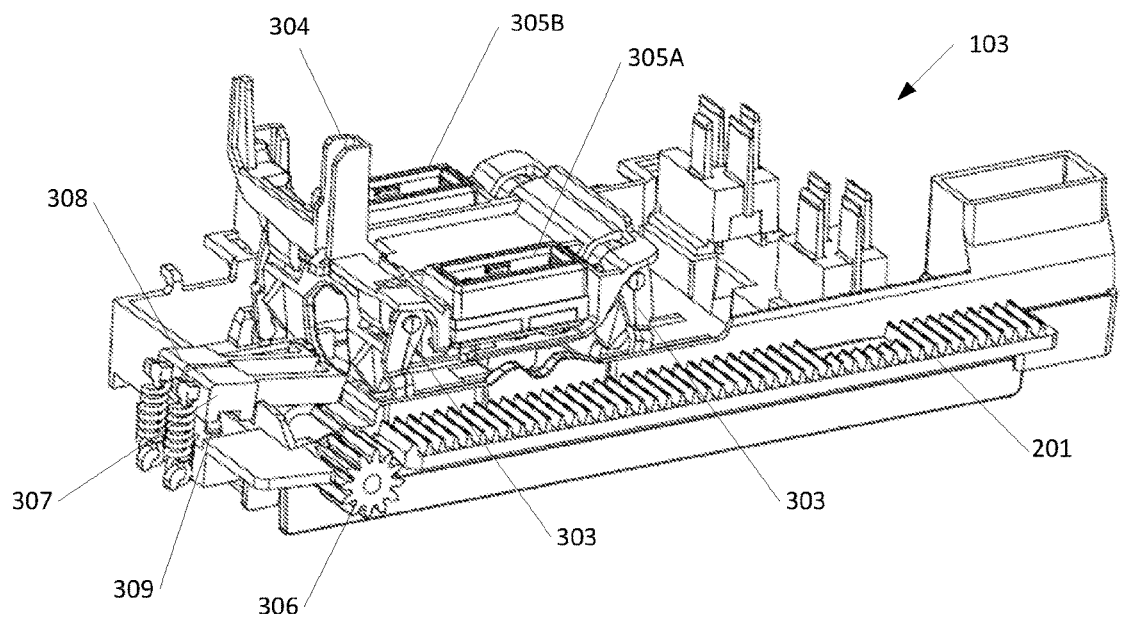
FIG. 9 is a perspective view of an example service station.

FIG. 9 illustrates a perspective view of the example service station 103 illustrating the rack 201, the post 304, the caps 305A and 305B and the geared camshaft 306, previously described. FIG. 9 also includes spring-loaded vent-arms 307 and 308, which are operated by the geared camshaft as part of the printhead priming and venting described below. Also illustrated in FIG. 9 is a vent 309 that can be sealed or unsealed by vent-arm 307 as described below. There is also a second vent corresponding to vent-arm 308 that is not visible in FIG. 9 (which will be designated as vent 310 in subsequent descriptions).

Figure 10:
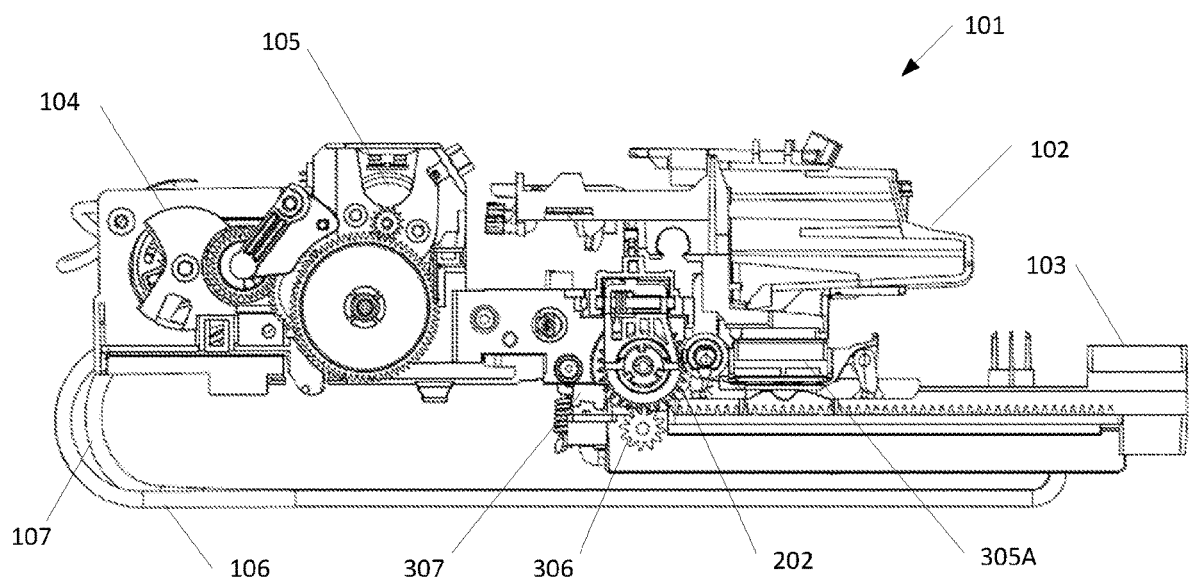
FIG. 10 is a side view of the example subassembly of FIG. 3.

Turning now to FIG. 10, there is illustrated a side view of subassembly 101 illustrating many of the components previously described, including the print carriage assembly 102, the service station 103, the motor 104, the vacuum pump 105, the vacuum lines 106 and 107, the pinion 202, a priming cap 305A, the geared camshaft 306 and the spring-loaded vent-arm 307.

Figure 11:
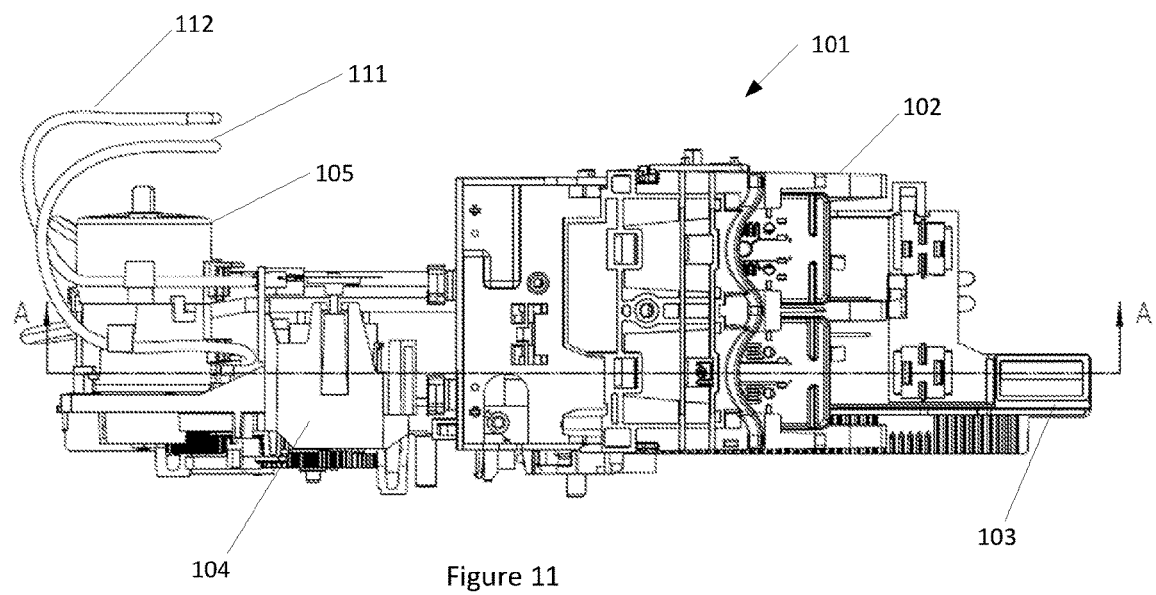
FIG. 11 is a top view of the example subassembly of FIG. 3.

FIG. 11 is a top view of subassembly 101 illustrating the print carriage assembly 102, the service station 103, the motor 104 and the vacuum pump 105. In addition, FIG. 11 illustrates ink disposal lines 111 and 112, not clearly visible in previous figures, which exit from the vacuum pump.

Figure 12:
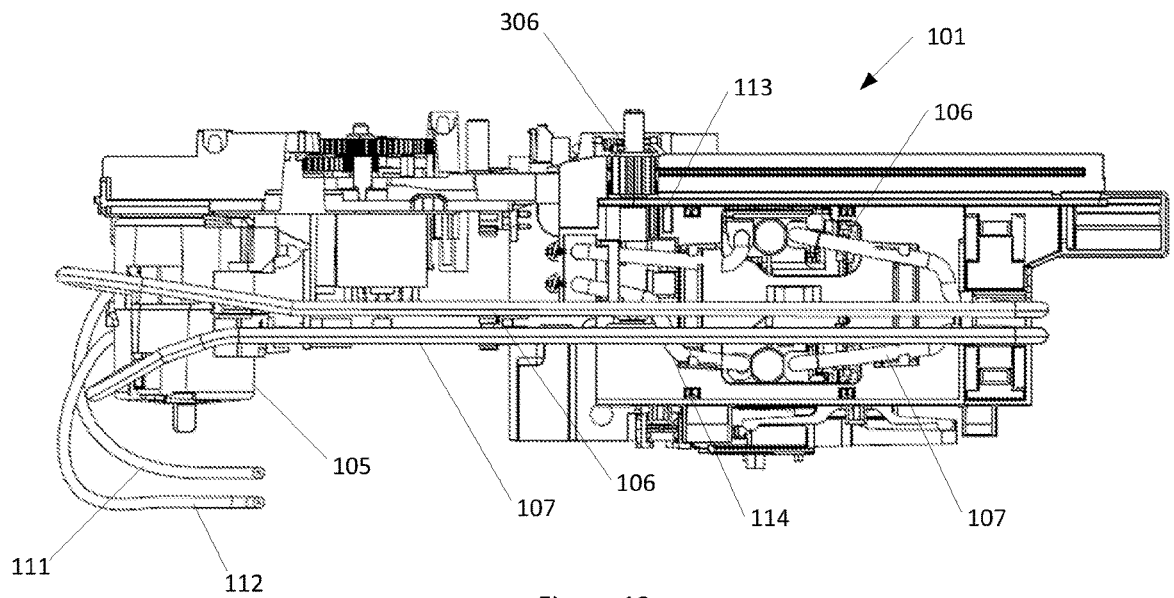
FIG. 12 is a bottom view of the example subassembly of FIG. 3.

FIG. 12 is a bottom view of subassembly 101 illustrating the service station 103, the motor 104, the vacuum pump 105, vacuum line 106 connected to a priming port on priming cap 305A, vacuum line 107 connected to a priming port on priming cap 305B, ink disposal lines 111 and 112, geared camshaft 306 engaged with the pinion 202, a venting line 113 connected to a venting port on priming cap 305A, and a venting line 114 connected to a venting port on priming cap 305A.

Figure 13:
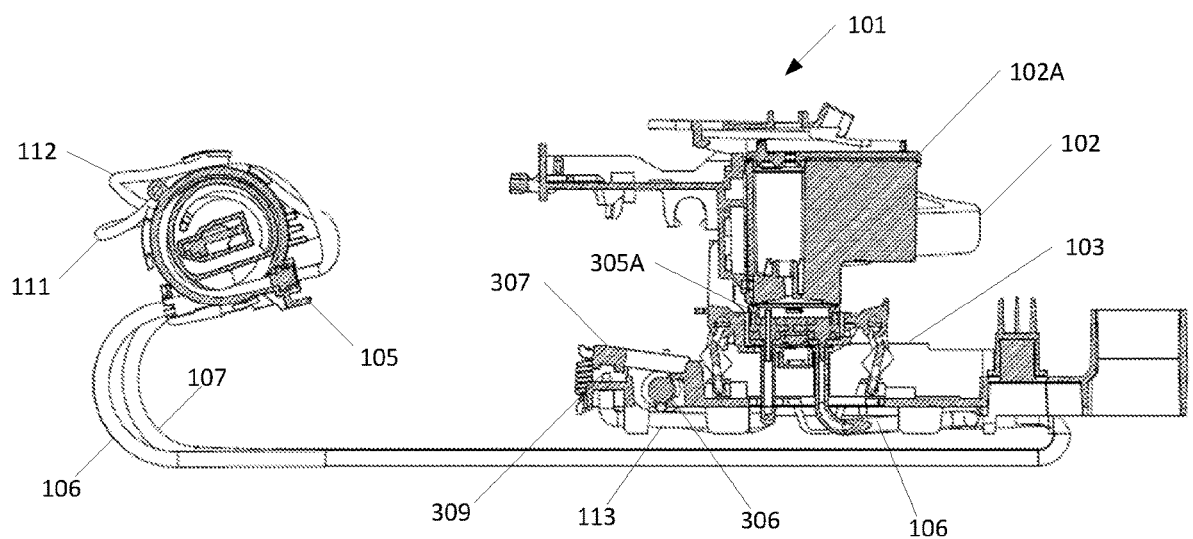
FIG. 13 is a sectional view of the example subassembly of FIG. 3.

FIG. 13 is a sectional view of subassembly 101 illustrating section A-A of FIG. 11. Visible in FIG. 13 are the print carriage assembly 102, printhead assembly 102A, service station 103 including priming cap 305A, geared camshaft 306, vent arm 307, vent line 113 connected between vent 309 and vent-arm 307. Also shown in FIG. 13 are vacuum pump 105, vacuum lines 106 and 107, and ink disposal lines 111 and 112. Note that motor 104 has been intentionally omitted from this view.

Figure 14:
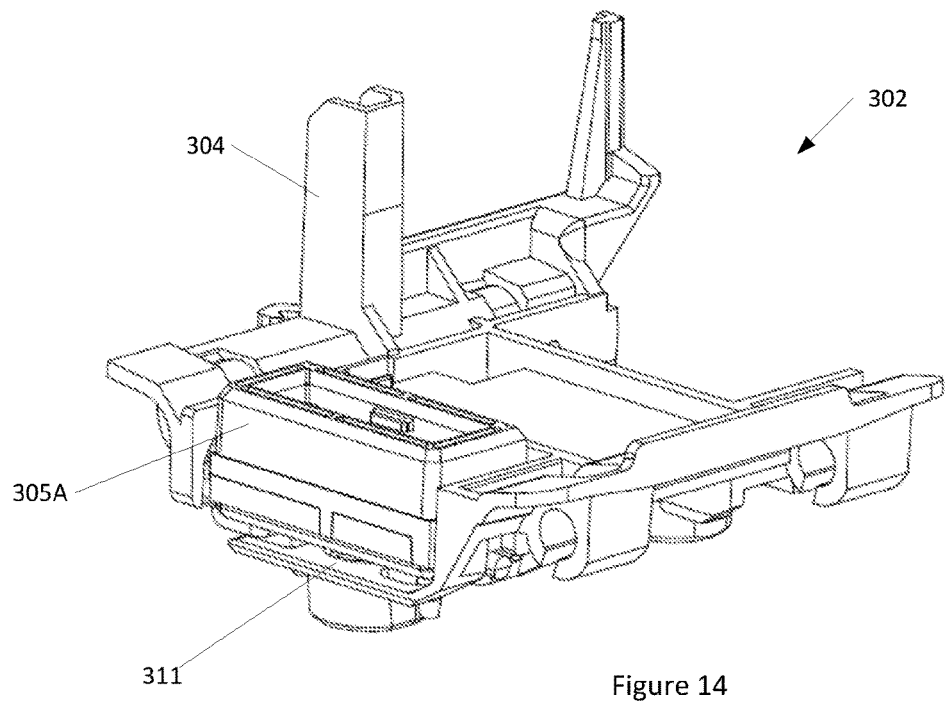
FIG. 14 is a perspective view of an example cap sled assembly.

FIG. 14 is a perspective view of an example cap sled assembly 302 with priming cap 305B removed to display additional details of the cap sled assembly. Also shown in FIG. 14 is priming cap 305A set in a cavity 311 of the cap sled assembly 302, and the post 304 previously described. FIG. 5 is a top view of the cap sled assembly 302 of FIG. 14, illustrating the post 304, the priming cap 305A and the cavity 311.

Figure 15:
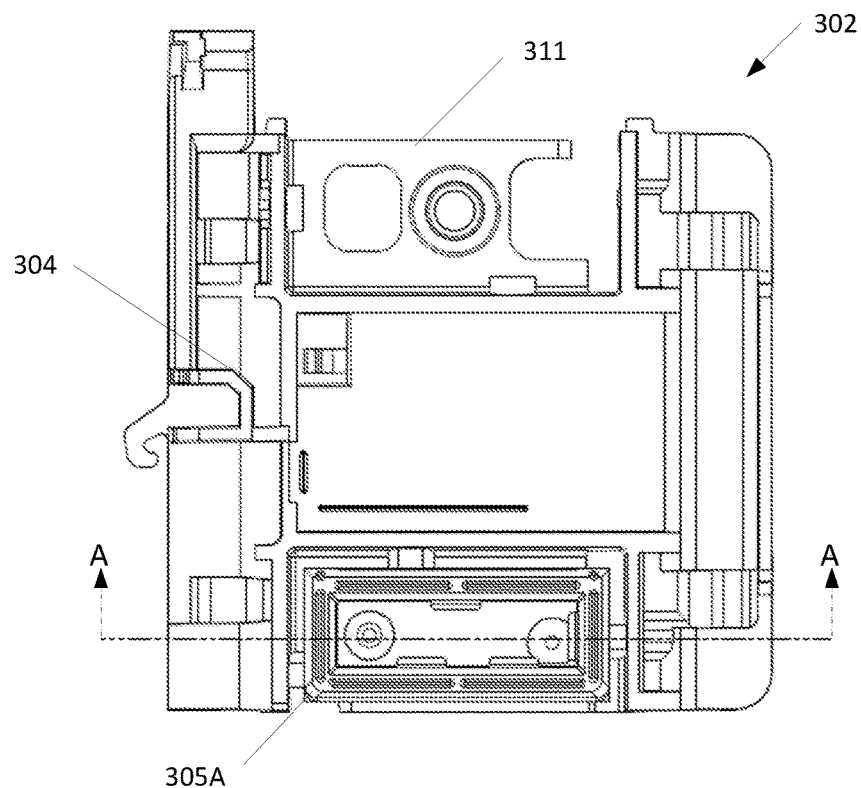
FIG. 15 is a top view of the example cap sled assembly.
Figure 16:
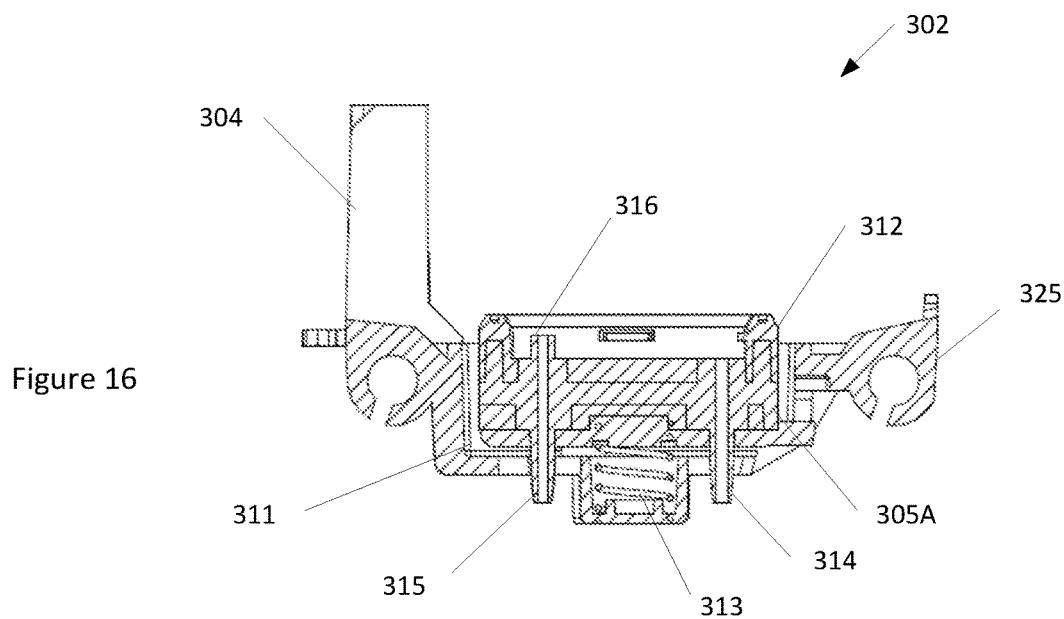
FIG. 16 is a sectional view of the example cap sled assembly.

FIG. 16 is a sectional view of the example cap sled assembly of FIG. 15 through section A-A of FIG. 15. Illustrated in FIG. 16 are the post 304 and cross-sections of the cap sled 325 and the priming cap 305A. As shown in FIG. 16, priming cap 305A includes an elastomeric lip 312 and rests on a spring 313 in the cavity 311. During priming, when the cap sled assembly 302 engages the print carriage assembly 102, spring 313 is compressed between the cap sled 325 and the priming cap 305A and applies a sealing force between the elastomeric lip 312 and its corresponding printhead in the print carriage assembly 102 (e.g., printhead assembly 102A). Each priming cap 305 includes two ports, a priming port 314 and a venting port 315, which are described in greater detail below. Note, however, that in the example priming cap of FIG. 16, the internal opening 316 of venting port 315 is above the corresponding opening of the priming port. It will be appreciated that this configuration will allow ink to pool in the priming cap 305 without contaminating the venting port 315 or its corresponding vent line 113.

Figure 17:
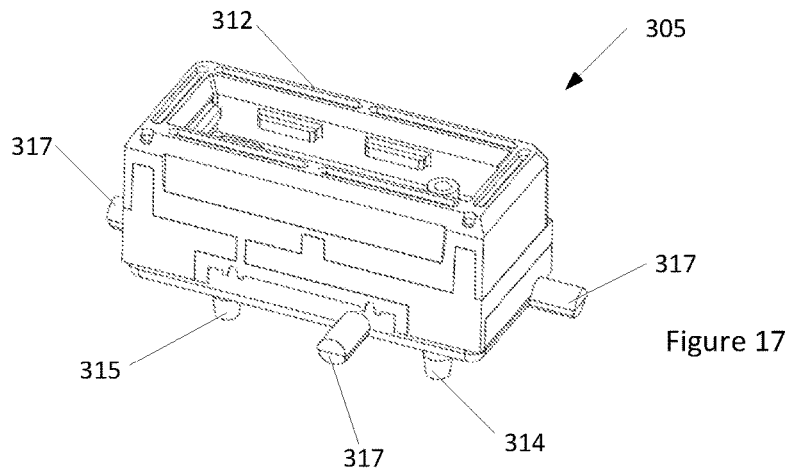
FIG. 17 is a perspective view of an example priming cap.
Figure 18:
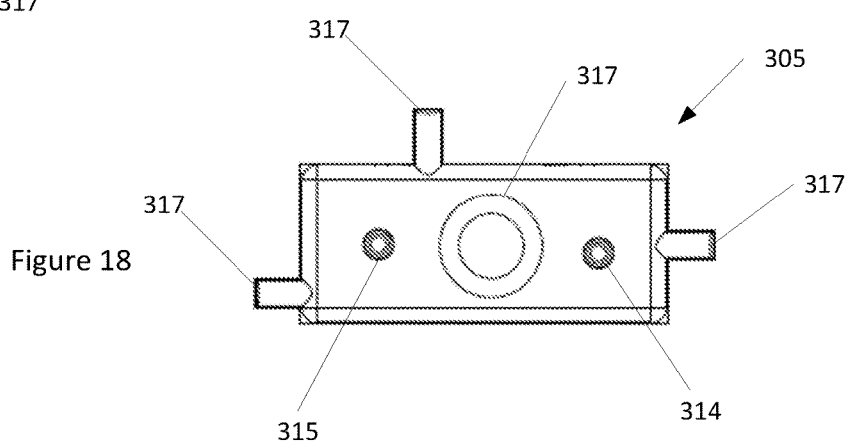
FIG. 18 is a bottom view of the example priming cap.

FIG. 17 is a perspective view of an example generic priming cap 305 illustrating the elastomeric lip 312, the priming port 314 and the venting port 315. In one example, priming cap 305 has three posts 317 to provide gimbal supports for the priming cap 305 when it engages with the print carriage assembly 102 for priming. FIG. 18 is a bottom view of the example priming cap 305 illustrating the priming port 314, the venting port 315 and the gimbal posts 317. Also illustrated in FIG. 18 is an annular recess 318 to position the cap 305 on the spring 313 in the cap sled assembly 302.

The following description of the structure and function of an example priming and venting system is provided hereinafter within the context of the foregoing description of the example physical structure of the subassembly 101. As noted above, priming and venting operations are timed to remove ink and air from the printhead, and separate priming and venting ports allow the venting path to be free of ink.

Figure 19:
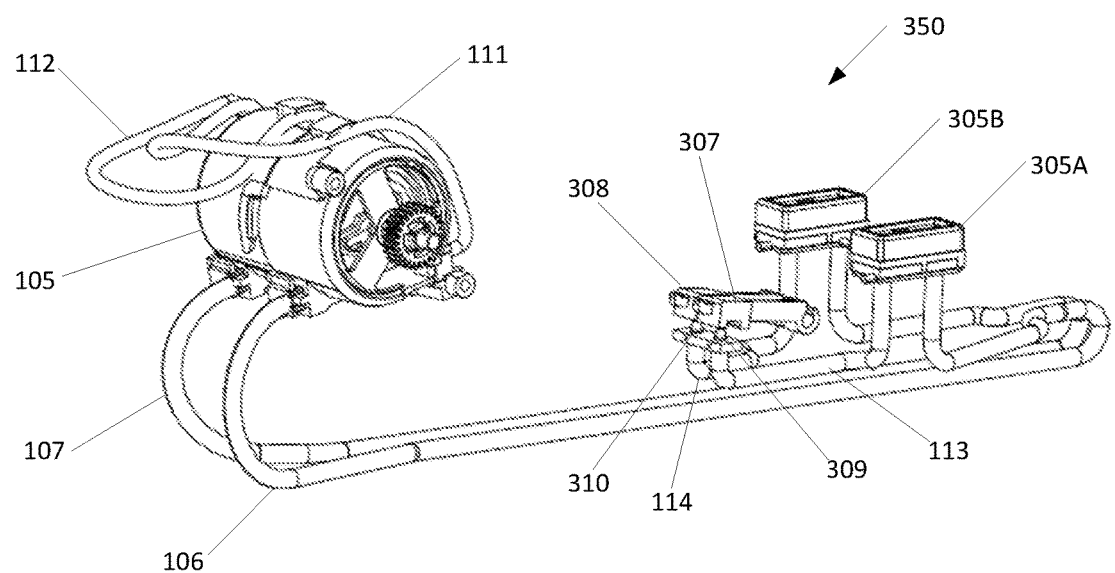
FIG. 19 is a perspective view illustrating isolated components of an example printhead priming and venting system.

FIG. 19 illustrates isolated components of an example dual priming and venting system 350. The system 350 includes a first priming and venting subsystem including priming cap 305A to seal printhead assembly 102A (see FIG. 4), vacuum line 106 connected between the priming port 314 (see FIG. 17) of priming cap 305A and the vacuum pump 105, vent line 113 connected between venting port 315 (see FIG. 17) of priming cap 305A and vent 309, and vent-arm 307 to seal and unseal vent 309. The system 350 also includes a second priming and venting subsystem including priming cap 305B to seal printhead assembly 102B (see FIG. 4), vacuum line 107 connected between the priming port 314 (see FIG. 17) of priming cap 305B and the vacuum pump 105, vent line 114 connected between venting port 315 (see FIG. 17) of priming cap 305B and vent 310, and vent-arm 308 to seal and unseal vent 310. It is noted that the springs that normally bias the vent-arms 307 and 308 to seal their respective vents (309 and 310) have been omitted from FIG. 19.

In the following discussion of the system 350, it is assumed that the priming caps 305 have been engaged with their respective printheads by the service station 103 as previously described in detail. It will be appreciated that when vent 309 is sealed by vent-arm 307, vacuum pump 105 will be able to form a vacuum within priming cap 305A in order to prime its corresponding printhead (e.g., printhead assembly 102A), pulling air and ink from the printhead. After a predetermined priming duration, with the vacuum pump 105 still running, vent 309 is unsealed by vent-arm 307, which breaks the vacuum on the printhead and prevents the extraction of any more ink from the printhead. In various examples, the predetermined priming duration may be sufficient to remove a predetermined volume from the printhead that may be sufficient to provide ink at the nozzles of the printhead. With the vent 309 unsealed, the vacuum pump 105 pulls in outside air through the vent 309, the priming cap 305A and the vacuum line 106, which clears ink from both the priming cap 305A and the vacuum line 106. The ink passes through the vacuum pump 105 (e.g., a peristaltic pump) and is disposed of through the ink disposal line 111 into an ink repository (not shown).

Similarly, it will be appreciated that when vent 310 is sealed by vent-arm 308, vacuum pump 105 will be able to form a vacuum within the priming cap 305B in order to prime its corresponding printhead (e.g., printhead assembly 102B), pulling air and ink from the printhead. After a predetermined priming duration, with the vacuum pump 105 still running, vent 310 is unsealed by vent-arm 308, which breaks the vacuum on the printhead and prevents the extraction of any more ink from the printhead. With the vent 310 unsealed, the vacuum pump 105 pulls in outside air through the vent 310, the priming cap 305B and the vacuum line 107, which clears ink from both the priming cap 305B and the vacuum line 107. The ink passes through the vacuum pump 105 and is disposed of through the ink disposal line 112 into the ink repository.

Figure 20:
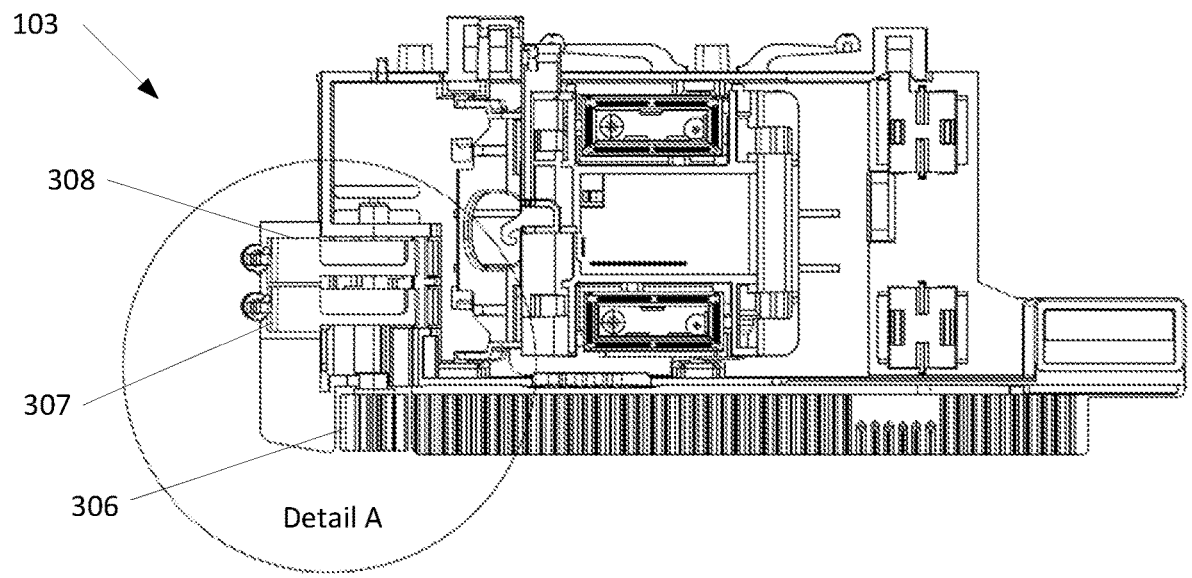
FIG. 20 is a top view of an example service station.
Figure 21:
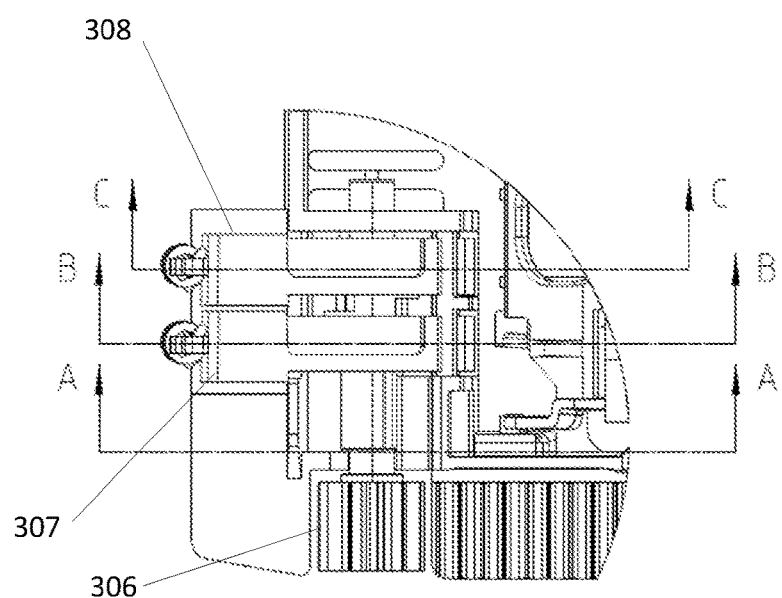
FIG. 21 is an enlarged detail of the example service station.

Turning now to FIGS. 20 and 21 to one implementation for controlling an example sequence of priming and venting operations. FIG. 21 is a top view of service station 103 with a Detail A that includes the geared camshaft 306 and vent-arms 307 and 308. FIG. 21 is an expanded view of Detail A containing three section lines. Section A-A is a section through the geared camshaft behind the gear that operates the camshaft. Section B-B is a section through the midline of vent-arm 307. Section C-C is a section through the midline of vent-arm 308. These sections are illustrated in FIGS. 22 through 36 for various states of the vent-arms, controlled by cams on the geared camshaft 306.

Figure 22:
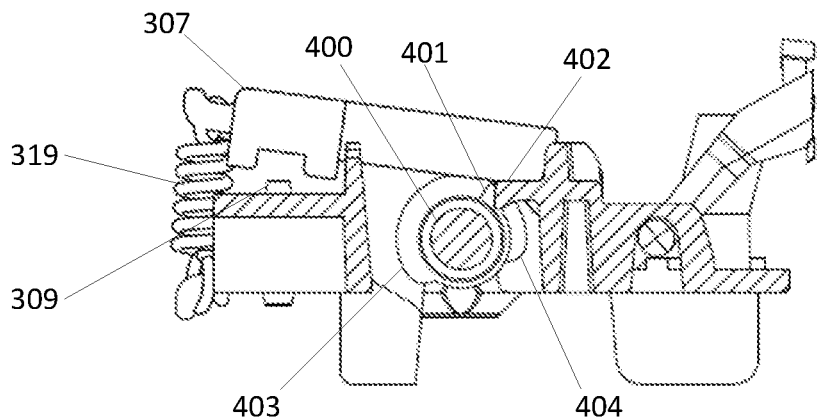
FIGS. 22-36 are sectional views of FIG. 21 illustrating camshaft controlled venting and priming.

FIG. 22 illustrates section A-A of FIG. 21 when vent 309 is unsealed by vent-arm 307 and vent 310 is unsealed by vent-arm 308. In one example, this state may define a state of the vents after the pinion 202 has engaged and rotated the geared camshaft 306 to an initial angular position. In FIG. 22, the shaft of geared camshaft 306 is denoted by camshaft 400. In one example, camshaft 400 may include an indexing arm 401 that stops an initial clockwise rotation of the camshaft 400 when it is blocked by a stop 402 in the body of the service station 103. In one example, as described previously, the pinion 202 that drives geared camshaft 306 may be driven by a torque-sensing motor (not shown) that senses when the indexing arm 401 has encountered stop 402, and stops applying torque to the pinion 202. Additionally, in one example, this initial position may be used to index an angular encoder (not shown) coupled to the drive motor in a feedback control loop, where the angular encoder is used to control subsequent angular positions of the shaft 400 for sequencing operations of the vent-arms 307 and 308.

Continuing now with FIG. 22, the initial clockwise (CW) rotation of the shaft 400 rotates a cam 403 to lift vent-arm 307 against the closing force of spring 319 to unseal vent 309. As previously described, when vent 309 is unsealed, the vacuum pump 105 cannot form a vacuum within the printhead (e.g., printhead assembly 102A), which is sealed to priming cap 305A (shown in FIG. 19), and is prevented from priming the printhead. Also, visible in FIG. 22 is a second cam 404 associated with vent-arm 308, which will be described in conjunction with FIG. 24, below.

Figure 23:
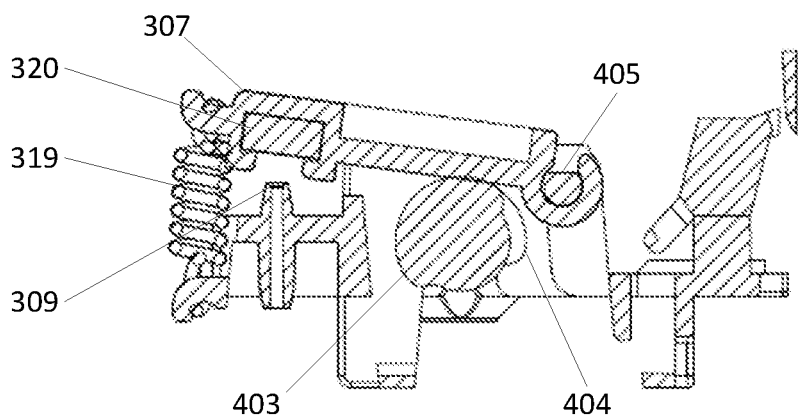

FIG. 23 illustrates section B-B of FIG. 21 when the camshaft 400 is in the same rotational position as in FIG. 22, and where vents 309 and 310 are unsealed. This section reveals additional details of vent-arm 307, which may include an elastomeric insert 320 to seal vent 309, and hinge pin 405 that provides a pivot point for vent-arm 307.

Figure 24:
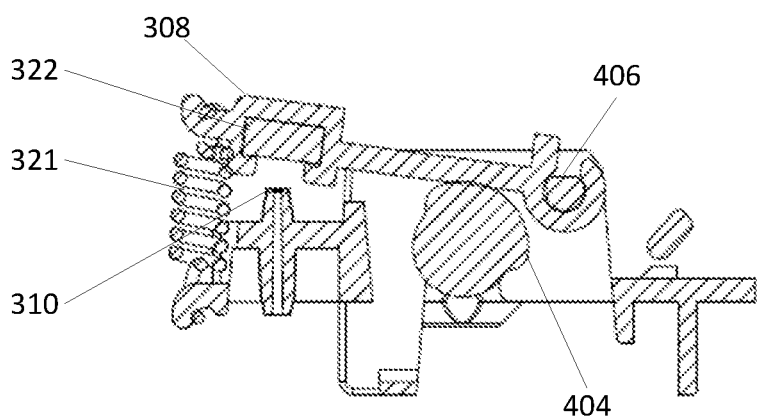

FIG. 24 illustrates section C-C of FIG. 21 when the camshaft 400 is in the same rotational position as in FIG. 22, where vents 309 and 310 are unsealed, as in FIG. 22. This section reveals additional details of vent-arm 308, which may include an elastomeric insert 320 to seal vent 310 and hinge pin 406 that provides a pivot point for vent-arm 308.

Figure 25:
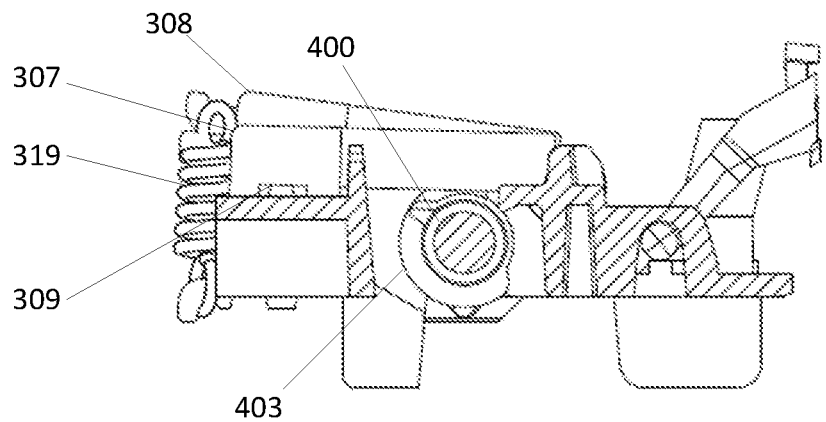

FIG. 25 illustrates section A-A of FIG. 21 after camshaft 400 has been rotated counterclockwise (CCW) sufficiently to disengage cam 403 from vent-arm 307, which seals vent 309 and allows the vacuum pump 105 to form a vacuum to prime the printhead associated with priming cap 305A.

Figure 26:
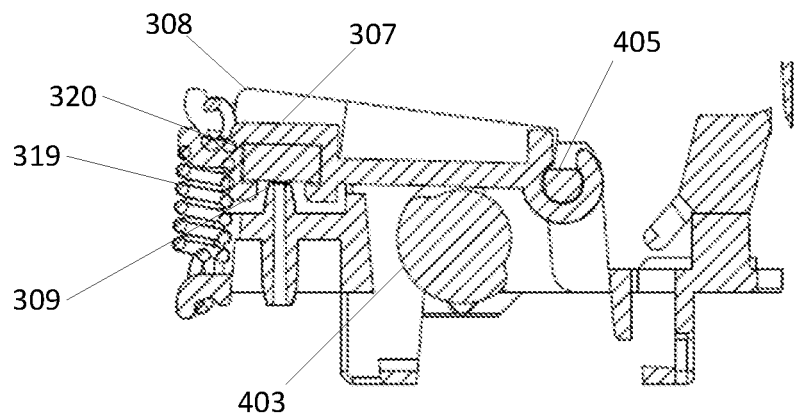

FIG. 26 illustrates section B-B of FIG. 21 when the camshaft 400 is in the same rotational position as in FIG. 25. As shown in FIG. 26, elastomeric insert 320 in vent-arm 307 provides a seal to vent 309 under the closing force provided by spring 319.

Figure 27:
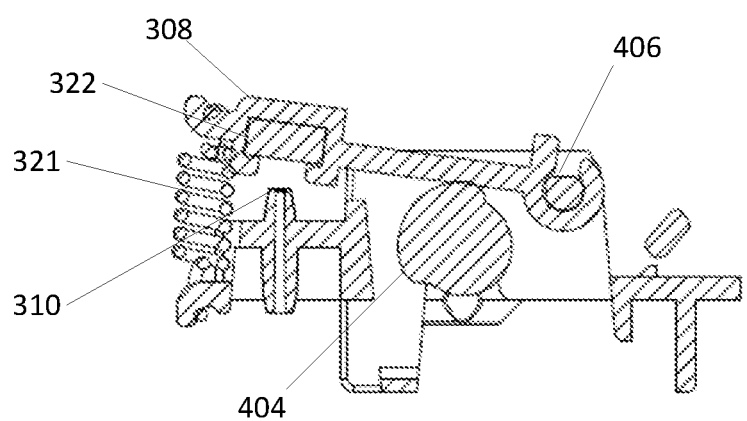

FIG. 27 illustrates section C-C of FIG. 21 when the camshaft 400 is in the same rotational position as in FIG. 25. As shown in FIG. 27, where cam 404 is still engaged with vent-arm 308 against the closing force of spring 321, which leaves vent 310 unsealed and prevents the vacuum pump 105 from priming the printhead (e.g., printhead assembly 102B) associated with the priming cap (e.g., priming cap 305B) connected to vent 310.

Figure 28:
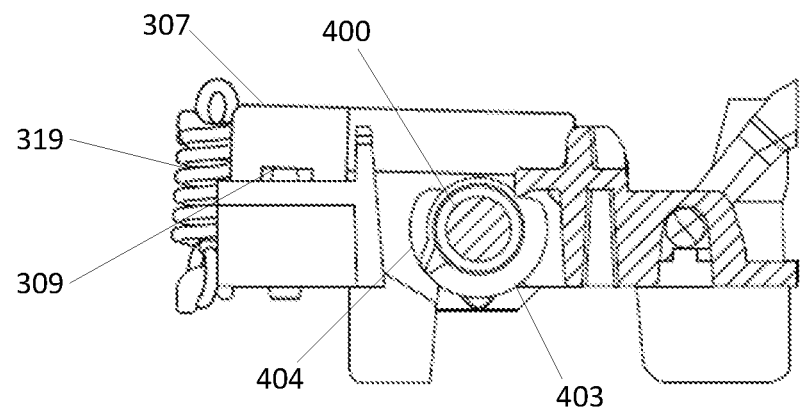

FIG. 28 illustrates section A-A of FIG. 21 after camshaft 400 has been rotated CCW sufficiently to disengage cam 403 from vent-arm 307.

Figure 29:
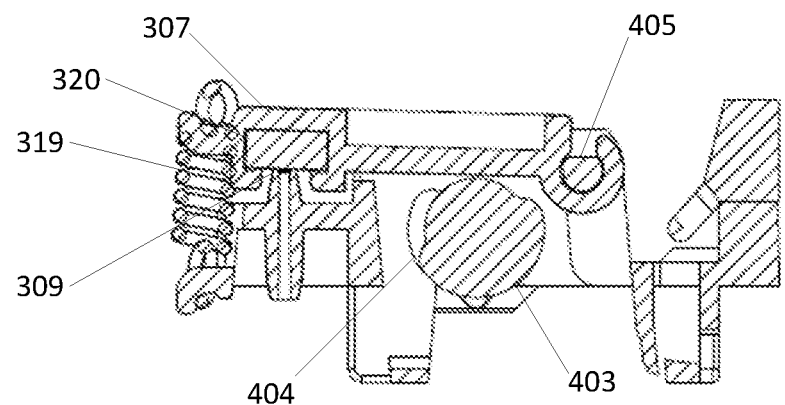

FIG. 29 illustrates section B-B of FIG. 21 when the camshaft 400 is in the same rotational position as in FIG. 28. As shown in FIG. 29, elastomeric insert 320 in vent-arm 307 provides a seal to vent 309 under the closing force provided by spring 319.

Figure 30:
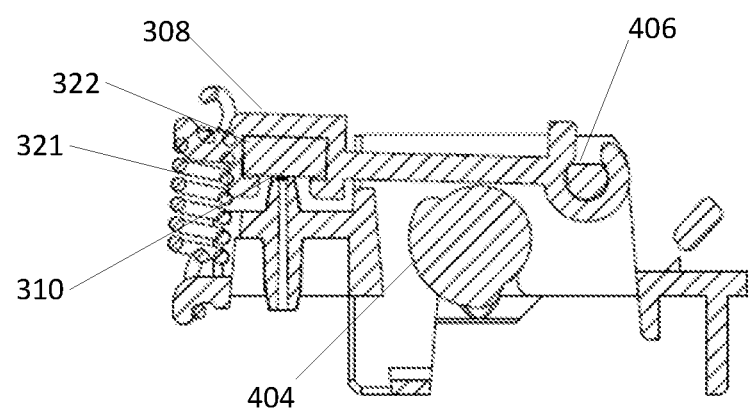

FIG. 30 illustrates section C-C of FIG. 21 when the camshaft 400 is in the same rotational position as in FIG. 28. As shown in FIG. 30, elastomeric insert 322 in vent-arm 308 provides a seal to vent 310 under the closing force provided by spring 321. This seal allows the vacuum pump 105 to form a vacuum on the printhead associated with priming cap 305B.

Figure 31:
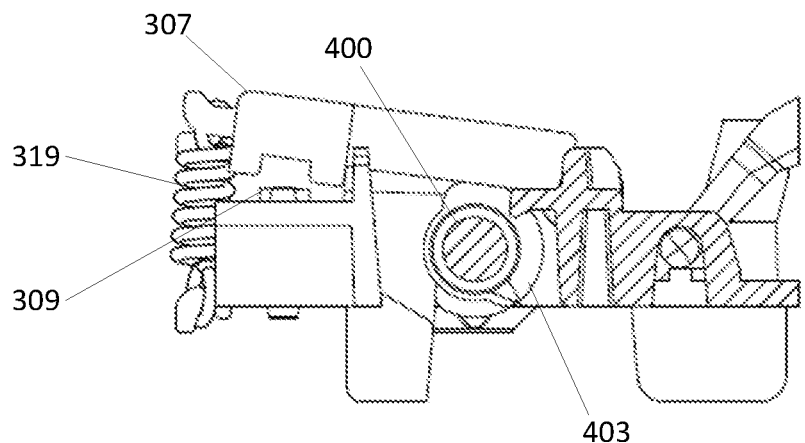

FIG. 31 illustrates section A-A of FIG. 21 after camshaft 400 has been rotated sufficiently CCW to reengage cam 403 with vent-arm 307 to lift vent-arm 307 against the closing force of spring 319 to unseal vent 309, which prevents vacuum pump 105 from priming the printhead connected with vent 309.

Figure 32:
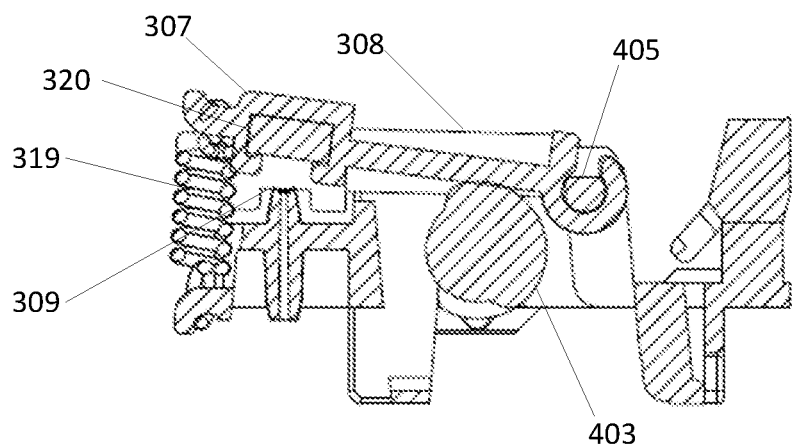

FIG. 32 illustrates section B-B of FIG. 21 when the camshaft 400 is in the same rotational position as in FIG. 31. As shown in FIG. 32, cam 403 prevents vent-arm 307 from sealing vent 309 against the closing force of spring 319, which allows the vacuum pump to clear priming cap 305A and vacuum line 106 of residual ink from the corresponding printhead.

Figure 33:
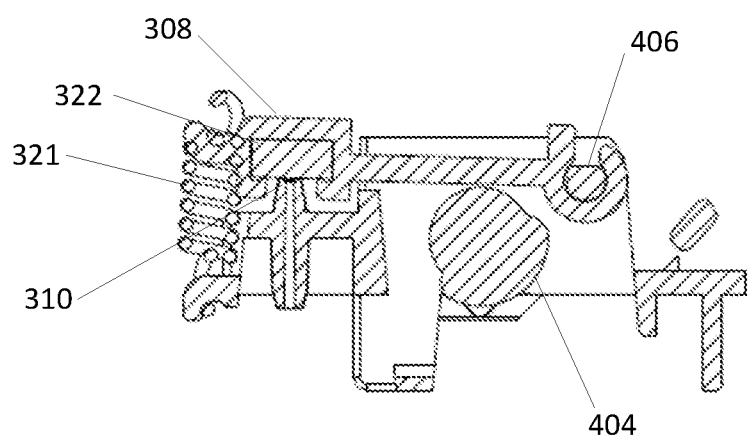

FIG. 33 illustrates section C-C of FIG. 21, when the camshaft 400 is in the same rotational position as in FIG. 31. As shown in FIG. 33, cam 404 is disengaged with vent-arm 308, which seals vent 310 and allows the vacuum pump 105 to prime the printhead (e.g., printhead assembly 102B) associated with the priming cap (e.g., priming cap 305B) connected to vent 310.

Figure 34:
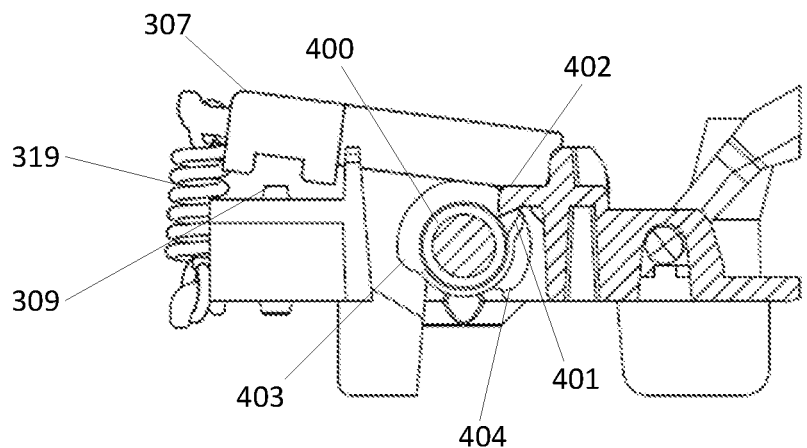

FIG. 34 illustrates section A-A of FIG. 21 when the camshaft 400 has been rotated to its most CCW position where indexing arm 401 is blocked by stop 402. In this position, cam 403 is still engaged with vent-arm 307 to prevent vent-arm 307 from sealing vent 309 against the closing force of spring 319.

Figure 35:
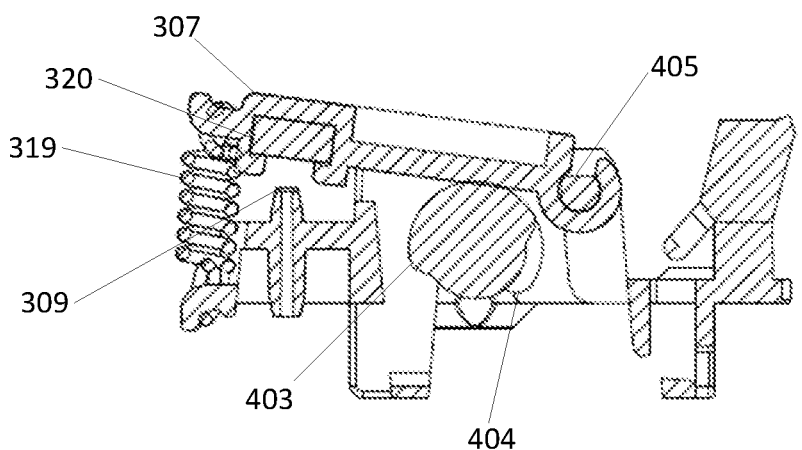

FIG. 35 illustrates section B-B of FIG. 21 when the camshaft 400 is in the same rotational position as in FIG. 34, and where vent 309 is unsealed.

Figure 36:
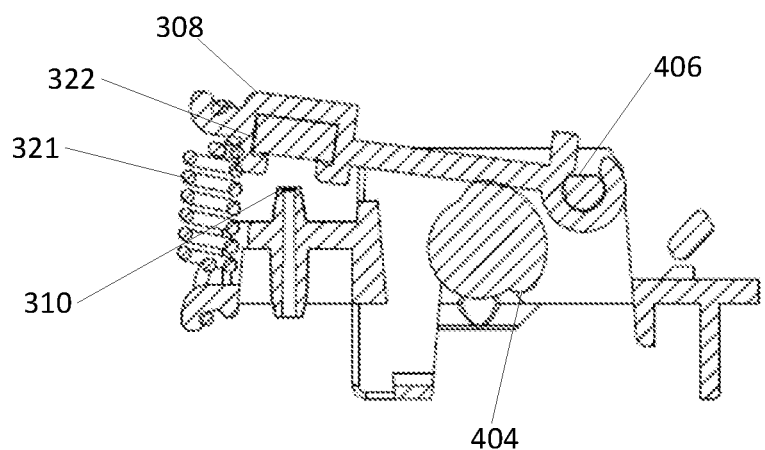

FIG. 36 illustrates section C-C of FIG. 21 when the camshaft 400 is in the same rotational position as in FIG. 34. In this position, cam 404 is reengaged with vent-arm 308 to prevent vent-arm 308 from sealing vent 310 against the closing force of spring 321.

Thus, timing of the priming and venting operations allows removal of ink and air from the printhead and the venting path to be free of ink. It will be appreciated that the sequence of priming and venting operations described above is merely one example of many possible sequences that could be implemented by different camshaft designs.

Figure 37:
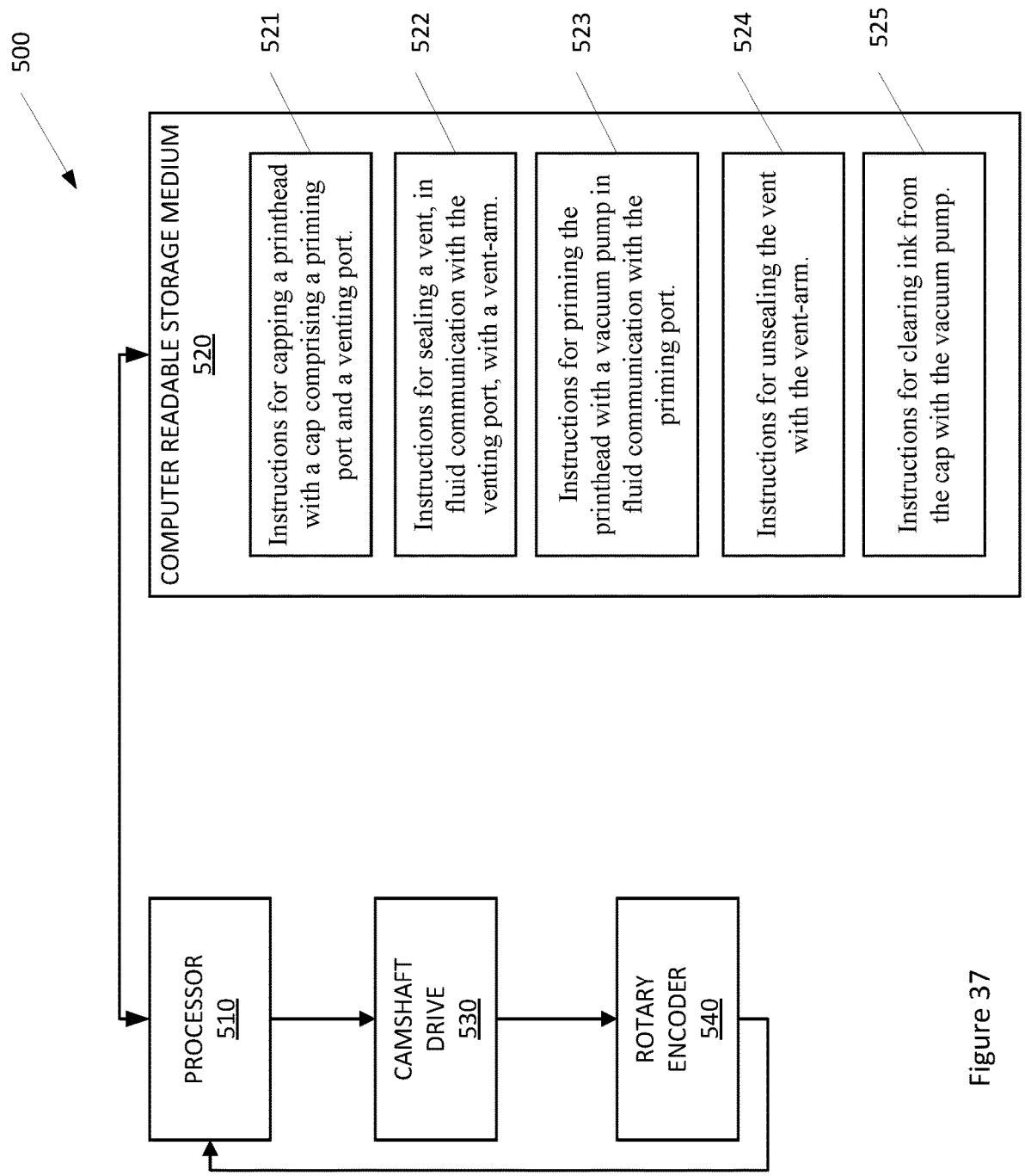
FIG. 37 is a block diagram of an example system for priming and venting a printhead.

Referring now to FIG. 37, a block diagram of an example system is illustrated with a non-transitory computer-readable storage medium, including instructions executable by a processor for priming and venting a printhead. The example system 500 includes a processor 510 coupled with a non-transitory computer-readable storage medium 520, including example instructions 521-525 for priming and venting a printhead. In various examples, the non-transitory computer-readable storage medium 520 may be any of a variety of storage devices including, but not limited to, a random-access memory (RAM) a dynamic RAM (DRAM), static RAM (SRAM), flash memory, read-only memory (ROM), programmable ROM (PROM), electrically erasable PROM (EEPROM), or the like. In various examples, the processor 510 may be a general-purpose processor, a controller, special purpose logic, or the like.

Example system 500 may also include a camshaft drive system 530 that controls the rotation of a camshaft that opens and closes a vent for priming and venting the printhead. And a rotary position encoder 540 to detect the angular position of the camshaft and to report the angular position of the camshaft to the processor 510 in a feedback control loop.

The example instructions include instructions for capping a printhead with a cap comprising a priming port and a venting port (instruction 521). For example, as described above with respect to FIG. 8, a service station (e.g., service station 103) with a cap sled assembly (e.g., cap sled assembly 302) containing a priming cap (e.g., priming cap 305) is translated (e.g., by rack 201 and pinion 202) to engage a printhead assembly (e.g., printhead assembly 102) where the cap seals a printhead in the printhead assembly.

The example instructions further include instructions for sealing a vent in fluid communication with the venting port. For example, as described above with respect to FIGS. 22-36, a camshaft (e.g., camshaft 400) is rotated to disengage a cam (e.g., cam 403) from a vent-arm (e.g., vent-arm 307) to seal a vent (e.g., vent 309) that is connected to a venting port (e.g., venting port 315) in a priming cap (e.g., priming cap 305) by a venting line (e.g., venting line 113).

The example instructions also include instructions for priming the printhead with a vacuum pump in fluid communication with the priming port. For example, as described above with respect to FIG. 19, a vacuum pump (e.g., vacuum pump 105) primes the printhead by forming a vacuum at the priming port (e.g. priming port 314) in the priming cap (e.g., priming cap 305) with a vacuum line (e.g., vacuum line 106).

The example instructions also include instructions for unsealing the vent with the vent-arm. For example, as described above with respect to FIGS. 22-36, the camshaft (e.g., camshaft 400) is rotated to engage the cam (e.g., cam 403) with the vent-arm (e.g., vent-arm 307) to unseal the vent (e.g., vent 309) that is connected to the venting port (e.g., venting port 315) in the priming cap (e.g., priming cap 305) by the venting line (e.g., venting line 113).

Finally, the example instructions include instructions for clearing ink from the cap with the vacuum pump. For example, as described above with respect to FIG. 19, the vacuum pump (e.g., vacuum pump 105) removes ink from the priming cap (e.g., priming cap 305) through the priming port (e.g., priming port 314).

The foregoing description has presented examples of apparatus, systems and computer readable media for priming and venting a printhead assembly in an inkjet printer.

In one example, a disclosed apparatus includes a cap to seal a set of nozzles in a printhead assembly, where the cap includes a priming port and a venting port. The apparatus also includes a vacuum pump in fluid communication with the priming port and a vent in fluid communication with the venting port, where the vent-arm is operative to seal and unseal the vent, and where a cam on a camshaft is engaged with the vent-arm to selectively seal and unseal the vent.

In one example, a disclosed system includes a cap sled assembly to seal a printhead of a printhead assembly, where the cap sled assembly includes a cap and the cap includes a priming port and a venting port. The system also includes a vacuum pump in fluid communication with the priming port, a vent in fluid communication with the venting port, and a vent-arm to seal and unseal the vent. The system also includes a cam on a camshaft engaged with the vent-arm to sequence operations of the vent-arm.

Thus, in accordance with various examples provided herein, camshaft controlled vents may be used to prime and vent printheads in an inkjet printer.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. An apparatus, comprising:
   a first cap to seal a first set of nozzles in a printhead assembly, the first cap including a first priming port and a first venting port;
   a vacuum pump in fluid communication with the first priming port;
   a first vent in fluid communication with the first venting port;
   a first vent-arm to seal and unseal the first vent; and
   a first cam on a camshaft, engaged with the first vent-arm to selectively seal and unseal the first vent.

2. The apparatus of claim 1, further comprising a line to provide the fluid communication between the vacuum pump and the first priming port, wherein the vacuum pump is enabled to prime the first set of nozzles when the first vent is sealed, and wherein the vacuum pump is enabled to evacuate fluid from the first cap and the line when the first vent is unsealed.

3. The apparatus of claim 1, further comprising:
   a second cap to seal a second set of nozzles in the printhead assembly, the second cap comprising a second priming port and a second venting port;
   the vacuum pump in fluid communication with the second priming port;
   a second vent in fluid communication with the second venting port;
   a second vent-arm to seal and unseal the second vent; and
   a second cam on the camshaft, engaged with the second vent-arm to selectively seal and unseal the second vent.

4. The apparatus of claim 3, wherein the vacuum pump is enabled to prime the first set of nozzles when the first vent is sealed, and wherein the vacuum pump is enabled to prime the second set of nozzles when the second vent is sealed.

5. The apparatus of claim 3, wherein the vacuum pump is prevented from priming the first set of nozzles when the first vent is unsealed, and wherein the vacuum pump is prevented from priming the second set of nozzles when the second vent is unsealed.

6. The apparatus of claim 3, further comprising a cap sled assembly to engage the first cap and the second cap with the printhead assembly, the cap sled assembly attached to a shuttle by pivoting links that raise the cap sled assembly to engage the first cap and the second cap with the printhead assembly when the cap sled assembly contacts the printhead assembly.

7. The apparatus of claim 6, wherein the shuttle comprises a rack, driven by a pinion, to engage the cap sled assembly with the printhead assembly, and wherein the pinion is operative to rotate the camshaft to sequence operations of the first vent-arm and the second vent-arm.

8. The apparatus of claim 7, wherein rotation of the camshaft is operative to generate a sequence of operating states, comprising:
   a first state with the first vent unsealed and the second vent unsealed;
   a second state with the first vent unsealed and the second vent sealed;

a third state with the first vent sealed and the second vent sealed; and
a fourth state with the first vent sealed and the second vent unsealed.

9. The apparatus of claim 3, wherein the first vent-arm is spring-loaded and biased to seal the first vent in the absence of the first cam, and wherein the second vent-arm is spring-loaded and biased to seal the second vent in the absence of the second cam.

10. The apparatus of claim 1, further comprising a motor to rotate the camshaft and the first cam to move the first vent-arm to selectively seal and unseal the first vent.

11. The apparatus of claim 1, wherein the first cam comprises a circular component mounted on the camshaft at an off-center position.

12. The apparatus of claim 1, further comprising a cap sled assembly to engage the first cap with the printhead assembly, the cap sled assembly attached to a shuttle by pivoting links that raise the cap sled assembly to engage the first cap with the printhead assembly when the cap sled assembly contacts the printhead assembly.

13. The apparatus of claim 12, wherein the cap sled assembly comprises a post, wherein, when the post contacts the printhead assembly, the first cap will be raised into engagement with the first set of nozzles by motion of the pivoting links.

14. The apparatus of claim 1, wherein the vacuum pump is to operate while the first vent is sealed by the first vent-arm and continue operating when the first vent-arm unseals the first vent.

15. A system, comprising:
a cap sled assembly to seal a printhead of a printhead assembly, the cap sled assembly including a cap, the cap having a priming port and a venting port;
a vacuum pump in fluid communication with the priming port;
a vent in fluid communication with the venting port;
a vent-arm to selectively seal and unseal the vent; and
a cam on a rotatable camshaft, wherein the cam is engaged with the vent-arm such that rotation of the camshaft and cam sequence operations of the vent-arm.

16. The system of claim 15, further comprising a shuttle to transport the cap sled assembly to engage the printhead assembly, the shuttle comprising a rack engaged with a pinion.

17. The system of claim 16, wherein the pinion is operative to rotate the camshaft after the cap sled assembly is engaged with the printhead assembly to sequence the operations of the vent-arm.

18. A printer assembly, comprising:
a printhead assembly with a printhead nozzle;
a cap having a priming port and a venting port, the cap being to cover the printhead nozzle;
a vacuum pump coupled to the priming port through a vacuum line, the vacuum pump to evacuate material from the printhead nozzle through the priming port;
a vent assembly coupled to the venting port, the vent assembly including:
a vent in fluid communication with the venting port through a vent line; and
a vent-arm that is hinged to pivot around an axis to selectively seal or unseal the vent, the vent allowing air to be vented from the printhead nozzle through the venting port when the vent-arm unseals the vent;
a cam; and
a camshaft to rotate and drive the cam, the cam being coupled to the vent-arm to selectively seal and unseal the vent.

19. The printer assembly of claim 18, further comprising a cap sled assembly to engage the cap with the printhead assembly, the cap sled assembly attached to a shuttle by pivoting links that raise the cap sled assembly to engage the cap with the printhead assembly when the cap sled assembly contacts the printhead assembly.

* * * * *